April 30, 1940. F. STEBLER 2,198,889
FRUIT SIZER
Filed June 28, 1937 3 Sheets-Sheet 1

INVENTOR.
FRED STEBLER.
BY Philip A. Minnis
ATTORNEYS.

April 30, 1940.   F. STEBLER   2,198,889
FRUIT SIZER
Filed June 28, 1937   3 Sheets-Sheet 2

INVENTOR.
FRED STEBLER.
BY Philip A. Minnis
ATTORNEY

April 30, 1940.                F. STEBLER                2,198,889
                               FRUIT SIZER
                         Filed June 28, 1937            3 Sheets-Sheet 3

INVENTOR.
FRED STEBLER.
BY Philip A. Minnis.
    ATTORNEY.

Patented Apr. 30, 1940

2,198,889

UNITED STATES PATENT OFFICE 2,198,889

FRUIT SIZER

Fred Stebler, Riverside, Calif., assignor to Food Machinery Corporation, San Jose, Calif., a corporation of Delaware Application June 28, 1937, Serial No. 150,737

11 Claims. (Cl. 209—103)

This invention relates to sizing machines for separating fruit or the like into different grades in accordance with its diameter, and is concerned more particularly with provision of improved means for adjusting the sizer to accommodate varying conditions in the run of fruit being sized.

As is customary in such sizing machines, the fruit is fed in one or more single files between an adjustable pair of supporting and conveying elements whose spacing apart at various points along the gradeway determines the size of fruit which will drop through and be conveyed to the packing bins from which it is placed in boxes by a packer. From time to time during the packing season, different sizes of fruit will occur in larger numbers than the others so that it is necessary to provide one or more sizing sections for the same grade of fruit, and it is desirable therefore that the machine can be adjusted quickly so that it can accommodate whatever particular grade of fruit is in the greatest proportion in the lot of fruit being sized. It is also important that the entire gradeway be capable of adjustment so as to vary proportionately for each grade the size of the fruit which will pass into the corresponding packing bins. This is done in order to accommodate fruit which may be softer, and will not pack to the desired height in the boxes, whereby it is desirable to increase slightly the diameter of the fruit being placed in each box so that the boxes will be filled properly.

The machine of the instant invention is provided with various adjustments so that it can meet all the operating requirements during the packing season, including a master adjustment whereby the sizing sections of fruit may be adjusted simultaneously and proportionately to each particular grade of fruit to slightly increase or decrease the diameter of the fruit being packed in each grade. In addition, the adjusting means provides for the individual adjustment of any one sizing section or any one roller member in any section so that the number of sections accommodating a particular grade of the fruit can be varied as may be desired throughout the length of the machine.

It is a general object of the invention, therefore, to provide an improved sizing machine which is readily adjustable to meet various operating conditions.

Another object of the invention is to provide an improved sizing machine in which the various sizing sections for the different grades of fruit can be simultaneously adjusted in the proportion required for each particular grade of fruit to obtain a uniform pack-out of all different grades in the boxes.

Another object of the invention is to provide an improved drive arrangement for the sizing rollers of a sizing machine, which simplifies the adjustment thereof.

Other objects of the invention will appear as the description progresses with reference to the accompanying drawings, in which.

I have chosen to illustrate my invention as embodied in a conventional type of rope and roller sizer in which the sizing gradeway is composed of a travelling rope or similar element spaced from a plurality of sizing rollers, which are adjustable relative to the adjacent rope so that the spacing between the rope and the roller determines the size of fruit which will drop therebetween.

Figure 1:
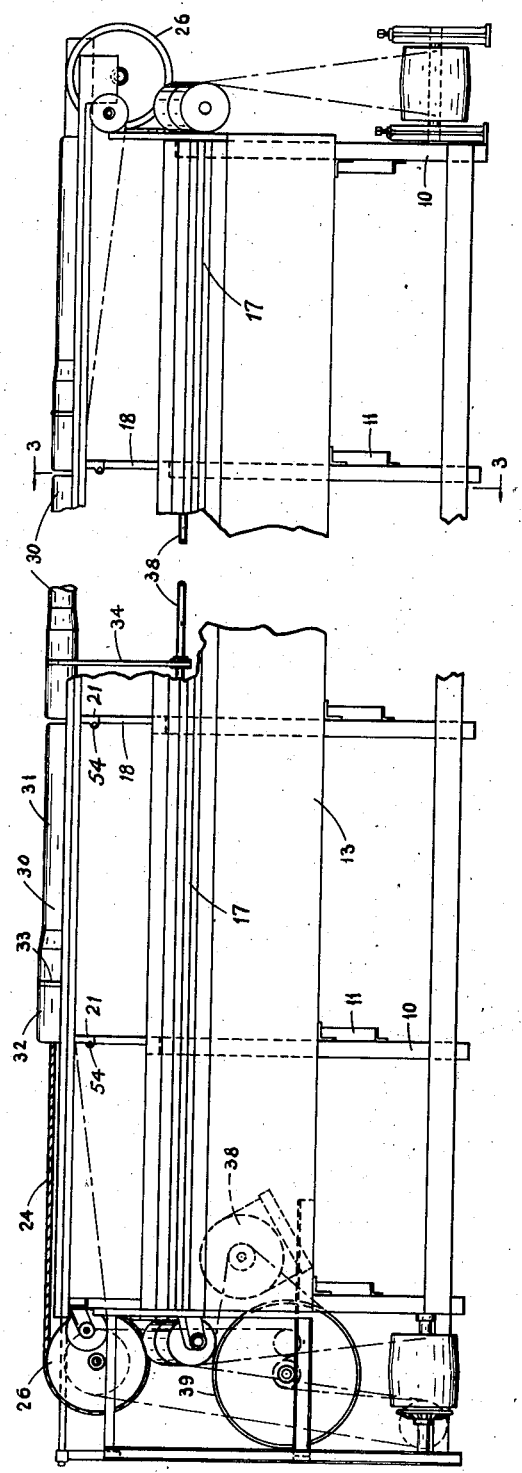
Fig. 1 is a side elevation of a sizing machine 10 employing my invention.
Figure 2:
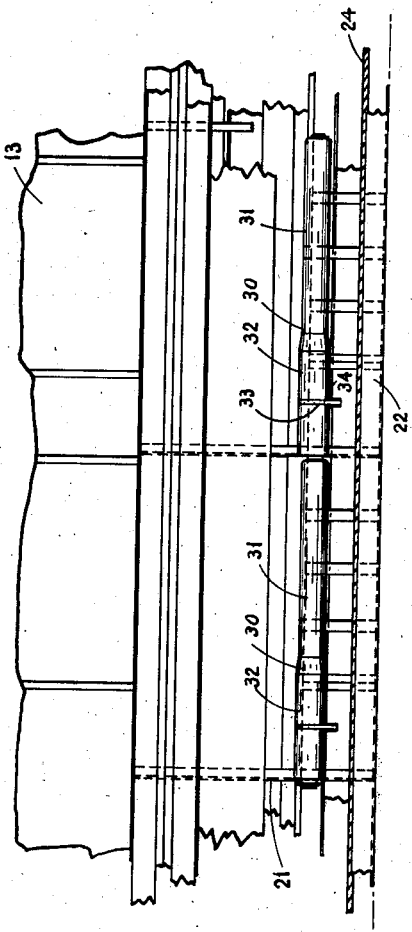
Fig. 2 is a fragmentary plan view of the sizing machine.
Figure 3:
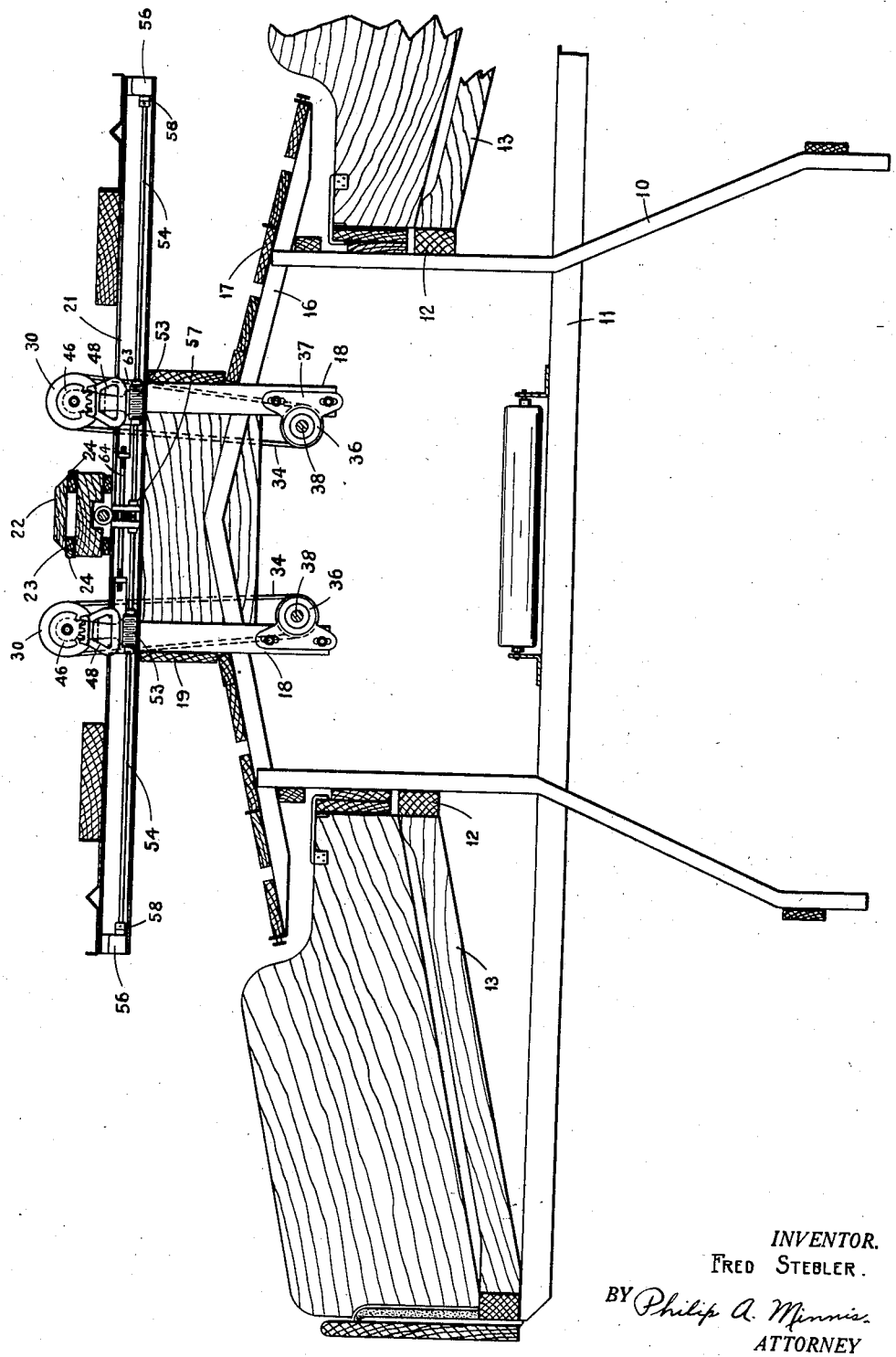
Fig. 3 is a vertical transverse section through the sizing machine with certain parts shown in elevation, and is taken in the plane of the line 3—3 in Fig. 1.

Referring to Figs. 1 to 3, the sizing machine includes a frame comprising standards 10 which are suitably connected by respective cross angles 11, and opposite longitudinally extending beams 12, on which respective sizing bins 13 of conventional construction are supported. At the top, the standards 10 may be connected by V-shaped cross angles 16, upon which the usual longitudinal conveyor supporting boards 17 may be supported as well as vertical standards 18 having longitudinal side boards 19 secured thereto and supporting a plurality of cross channels 21. Upon the cross channels 21 center grading rail 22 is mounted to provide tracks 23 for a pair of opposite sizing ropes 24 which extend along tracks 23 and around suitable guide pulleys 26 at the ends of the machine. Opposed to each rope 24 is a series of sizing rollers 30 to form therewith a pair of parallel gradeways, each having a series of sizing sections. The rollers 31 are mounted in a manner later described for adjustment toward and from the adjacent rope 24 whereby to vary the spacing therebetween, each roller having non-sizing portion 32 of larger diameter and a sizing portion 31 of smaller diameter. The above described structure is conventional and further description thereof in detail is not deemed necessary, it being understood that the ropes 23 are driven to convey fruit along the gradeways, while the sizing rollers are also rotated as later described to shift the pieces of fruit about, whereby it will drop through the gradeway at a location determined by its smallest diameter, and be directed to the appropriate bin in the usual manner.

In order to conserve space in the machine and to simplify the adjusting of the rollers relative to the sizing ropes, I have provided an advantageous arrangement of the drive means for the sizing rollers whereby no adjustment of such drive connection need be made when the sizing opening is varied. Intermediate the non-sizing section 32 of each roller, a circumferential groove 33 is provided to receive driving belt 34 which extends downwardly to a driving pulley 36 mounted for vertical adjustment by a bracket 37 on a post 18. Each pulley 36 is driven by a longitudinally extending shaft 38, a pair of which are provided for the two series of rollers disclosed in the embodiment of the invention shown. The shafts 38 may be suitably driven together with the ropes 24 and the associated conveyor belts from the motor 38 by belt and pulley drive means 39 of conventional construction. As will be seen more clearly in Fig. 3, the location of each pulley 36 with reference to the associated roller 30 and substantially at right angles to the direction of the adjustment of the roller toward and from the cooperating rope 24 enables the adjustment to be made without materially changing the distance between the center of the roller and the center of the driving shaft. In this manner, no compensating means is needed in the drive belts to accommodate the change in position of the roller as it is moved with respect to the rope by means which will now be described.

Figure 5:
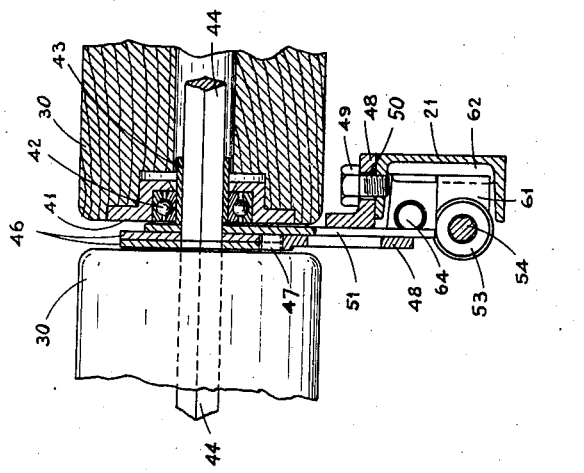
Fig. 5 is a fragmentary sectional view partly in elevation of a part of the sizer adjusting means.
Figure 4:
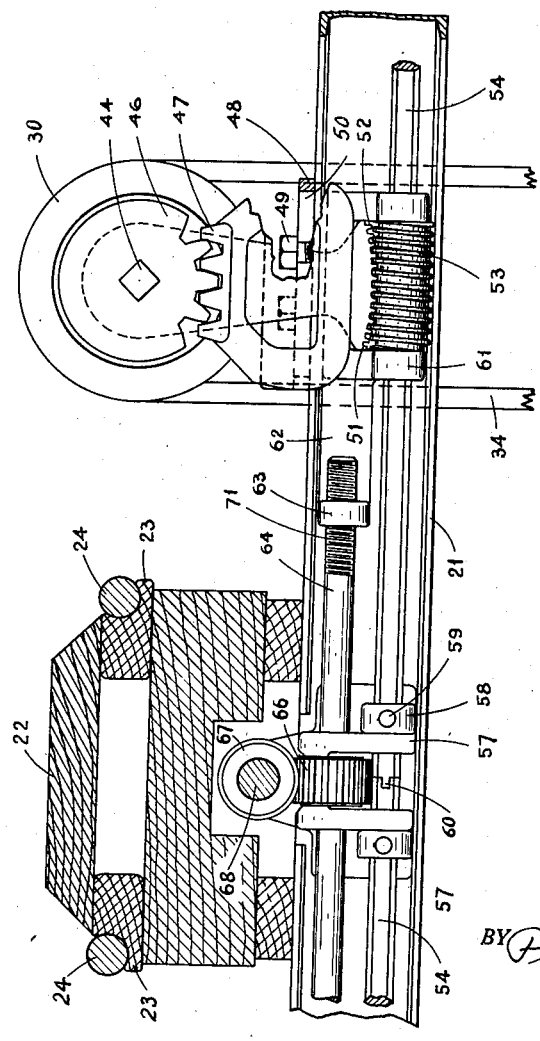
Fig. 4 is an enlarged sectional view similar to Fig. 3 with the adjusting means shown in elevation and partially broken away to illustrate certain details of construction.

Referring to Figs. 4 and 5, each roller 30 is recessed at each end to receive a bearing cage 41 in which roller bearing 42 is mounted with its inner race on a sleeve 43 secured on a square shaft 44 which extends freely through the roller. To support the roller, each shaft 44 carries at its ends a mutilated gear 46 which rests upon a gear rack 47 formed at the upper end of a supporting bracket 48, which may be secured on cross channel 21 by cap screws 49 which extend through a longitudinal slot 50 in the bracket 48 and are threaded in the channel 21. In this manner, the position of the bracket 48 on the associated channel 21 can be adjusted. As seen in Fig. 5, each rack 47 is sufficiently wide to support both gears 46 at the adjacent ends of adjacent rollers 30 with the gears 46 and the respective roller shafts 44 in abutting relation, the respective rollers being maintained thereon by their weight and by driving belts 34 therefor.

To provide for adjustment of a roller 30 relative to its supporting bracket 48, each roller is provided with a gear segment 51 secured at one end of its shaft 44 and extending downwardly through a slotted portion of the associated bracket 48 and having teeth 52 to engage a worm 53 which is slidably and non-rotatably mounted on a transverse adjusting shaft 54, which is preferably of non-circular cross-section. A pair of shafts 54 are provided in alignment for each set of parallel rollers of the adjacent gradeways in the machine, being supported at their outer and inner ends by respective bearings 56 and 57 suitably mounted on the associated channel 21. The positioning of shafts 54 with respect to bearings 56 and 57 is maintained by means of collars 58 releasably secured thereon by set screws 59. The respective outer ends of shafts 54 may be engaged by suitable socket wrench or the like whereby the shaft may be turned and correspondingly turn the worm 53 whereby the gear segment 51 is oscillated to move the roller 30 toward and from its associated rope 24. The inner ends of each pair of shafts 54 have a splined driving connection 60, whereby each set of rollers 30 may be adjusted simultaneously, or, if desired, separate adjustment thereof may be had by loosening the collars 58 and breaking the drive connection 60.

To provide for simultaneous adjustment of all the rollers of both gradeways, means are provided for enabling simultaneous axial movement of all the adjusting worms 53, such movement being preferably differential as between various sets of the rollers. Each worm 53 is confined between spaced apertured bosses 61 of a slide or bracket 62 slidably mounted on the shaft 54 and having a threaded offset ear 63 which is engaged by the threaded end of a shaft 64 journalled in the bearing brackets 57. Each shaft 64 preferably cooperates with a parallel set of slides 62, and has its ends reversely threaded to produce the proper movement of the associated rollers 30. Intermediate its ends, each shaft 64 is provided with a gear 66 meshing with a spiral pinion 67 on a longitudinally extending shaft 68, which has, therefore, an adjusting connection to each sizing roller of the machine whereby simultaneous adjustment of all such rollers can be effected. Preferably, threaded portions 71 at the ends of shaft 64 are provided with a different number of threads to the inch in accordance with the particular size of fruit which is adapted to pass by the associated sizing roller, so that the adjustment of slide 62, gear segment 51 and the associated roller 30 is proportional to the particular size of fruit which falls past such roller. In this manner, a simple and quickly operable differential adjustment of all of the rollers is provided by merely turning of the shaft 68. This adjustment, as previously explained, enables a uniform pack-out of all the boxes irrespective of changes in the condition of the fruit being sized and packed.

While I have shown and described a preferred embodiment of the invention, it is to be understood that the invention is capable of modification and variation without departing from the spirit thereof, so that its scope should be limited only by the scope of the appended claims.

1. In a sizer for fruit or the like, a pair of parallel gradeways having adjacent sets of parallel sizing sections, each sizing section including a roller adjustable to vary the width of the sizing opening and a worm associated with said roller to effect adjustment thereof by both rotational and axial movement, an adjusting shaft operatively associated with said worms of a set of sizing sections to effect the rotational movement thereof, and adjusting means associated with the worms of said sets of sizing sections to effect the axial movement thereof, said adjusting means including differential drive connections in the respective sets, whereby to provide a proportional adjustment of the sizing openings thereof in accordance with the initial sizing adjustments thereof.

2. In a sizer for fruit or the like, a pair of parallel sizing sections, each section comprising spaced apart sizing elements with one element adjustable relative to the other element to vary the width of the sizing opening therebetween, a gear segment associated with each of said adjustable elements, a worm engaged with each gear segment, an adjusting shaft slidably and non-rotatably engaged with each worm, adjacent ends of said shafts having a separable driving connection adapted for separation by sliding movement of said adjusting shafts relative to said worms to provide for simultaneous and independent adjustment of said adjustable sizing elements.

3. In a sizer for fruit or the like, a pair of parallel sizing sections, each section comprising spaced apart sizing elements with one element adjustable relative to the other element to vary the width of the sizing opening therebetween, a gear segment associated with each of said adjustable elements, a worm engaged with each gear segment, an adjusting shaft slidably and non-rotatably engaged with each worm, adjacent ends of said shafts having a driving connection to provide for simultaneous adjustment of said adjustable sizing elements, a slide associated with each worm to move the associated segment by axial movement of the associated worm, and a common operating shaft having a threaded connection with each slide.

4. In a sizer for fruit or the like, a pair of parallel gradeways comprising parallel series of sizing sections, each section comprising spaced apart sizing elements with one element adjustable relative to the other element to vary the width of the sizing opening therebetween, a gear segment associated with each of said adjustable elements, a worm engaged with each gear segment, an adjusting shaft extending transversely of a pair of parallel sizing sections of said series and slidably and non-rotatably engaged with the worms thereof, adjacent ends of said shafts having a driving connection to provide for simultaneous adjustment of said adjustable sizing elements, a slide associated with each worm to move the associated gear segment by axial movement of the associated worm, a common operating shaft having a threaded connection with the slides of each of said pairs of sections, and a drive shaft extending parallel with said gradeways and having a drive connection with each of said operating shafts.

5. In a sizer for fruit or the like, a pair of parallel sizing sections; each section including a roller movable to vary the width of the sizing opening, a rack adjacent each end of said roller, a shaft extending through said roller, means journalling said roller on said shaft, gear means carried by said shaft and engaging said racks to support said shaft and roller thereon, a gear segment carried by said shaft, a worm engaged with said gear segment, and an adjusting shaft slidably and non-rotatably engaged with said worm; the adjusting shafts of said sections having a driving connection to provide for simultaneous adjustment of the rollers of said sections.

6. In a sizer for fruit or the like, a pair of parallel sizing sections; each section including a roller movable to vary the width of the sizing opening, a rack adjacent each end of said roller, a shaft extending through said roller, means journalling said roller on said shaft, gear means carried by said shaft and engaging said racks to support said shaft and roller thereon, a gear segment carried by said shaft, a worm engaged with said gear segment, and an adjusting shaft slidably and non-rotatably engaged with said worm; the adjusting shafts of said sections having a driving connection to provide for simultaneous adjustment of the rollers of said sections, a slide associated with each worm to move the associated gear segment by axial movement of the associated worm, and a common operating shaft having a threaded connection with each of said slides.

7. In a sizer for fruit or the like, a gradeway having a sizing opening therein, a roller forming one side of said opening and movable to vary the width thereof, a rack adjacent each end of said roller, a shaft extending through said roller, means journalling said roller on said shaft, gear means carried by said shaft and engaging said racks to support said shaft and roller thereon, a gear segment carried by said shaft, a worm engaged with said gear segment, an adjusting shaft slidably and non-rotatably engaged with said worm, and a slide for moving said worm axially along said shaft to adjust said gear segment.

8. In a sizer for fruit or the like having a pair of spaced apart sizing elements, means for effecting relative adjustment between said elements to change the width of the sizing opening therebetween including a gear segment for effecting the relative movement between said elements, a worm operatively engaged with said gear segment, means for rotating said worm to operate said segment, and means slidable relative to said rotating means for effecting axial movement of said worm to operate said gear segment.

9. In a sizer for fruit or the like, a pair of parallel gradeways having a plurality of adjacent sets of parallel sizing sections provided with sizing openings, each sizing section including an adjustable member mounted for independent rotational and translatory movements to vary the width of the sizing opening, means for restraining said member from translatory movement during rotation thereof, means common to each set of sizing sections and connected to the adjustable members thereof for effecting simultaneous and equal adjustment of the adjustable members of said set by imparting one of said types of movement to said members, and master adjusting means common to all of said sets of sizing sections and having differential drive connections with the adjustable members of the respective sets for simultaneously imparting the other of said types of movement to said members, whereby to simultaneously effect a differential adjustment of the sizing openings of each set with respect to the sizing openings of the other sets.

10. In a sizer for fruit or the like, a gradeway having a series of sizing sections provided with sizing openings, each section including a roller adjustable to vary the width of the sizing opening and a worm mounted for independent rotational and axial movements, means for restraining said worm from axial movement during rotation thereof to effect said adjustment, said worm being operatively associated with said roller to effect adjustment thereof by either of said movements, individual adjusting means associated with each worm to impart one of said types of movement thereto, and master adjusting means having differential drive connections with the respective worms of said sections for simultaneously imparting the other of said types of movement to said worms, whereby to simultaneously effect a differential adjustment of the sizing openings of each section with respect to the sizing openings of the other sections.

11. A machine for sizing fruit or the like, comprising a pair of sizing sections arranged in side by side relation, each section including spaced apart sizing elements one of which is adjustable relative to the other to vary the spacing therebetween, a rotary member for each of said sections for actuating a corresponding sizing element to adjust the same, an individual rotatable adjusting shaft slidable in and coupled to each rotary member for imparting rotation thereto to adjust the adjustable sizing element upon rotation of said shaft, and interlocking drive means connecting said shafts to effect simultaneous operation of both shafts upon rotation of one of them, one of said shafts being slidable relative to the other to disengage said drive means and permit independent rotation of said shafts.

FRED STEBLER.